US006937229B2

(12) United States Patent
Murphy

(10) Patent No.: US 6,937,229 B2
(45) Date of Patent: Aug. 30, 2005

(54) KEYCAP FOR DISPLAYING A PLURALITY OF INDICIA

(76) Inventor: Kevin Murphy, 97 Forrest St., Plaistow, NH (US) 03865

( * ) Notice: Subject to any disclaimer, the term of this patent is extended or adjusted under 35 U.S.C. 154(b) by 583 days.

(21) Appl. No.: 09/941,241

(22) Filed: Aug. 28, 2001

(65) Prior Publication Data

US 2003/0206153 A1 Nov. 6, 2003

(51) Int. Cl.⁷ ............................................... G09G 5/00
(52) U.S. Cl. ......................... 345/168; 341/22; 400/490
(58) Field of Search ................................ 345/168, 169; 341/21–23, 27, 28; 400/483, 485, 486, 490, 495; 434/112, 113

(56) References Cited

U.S. PATENT DOCUMENTS

| | | | | |
|---|---|---|---|---|
| 3,648,394 A | * | 3/1972 | Hepner | 40/331 |
| 5,514,855 A | * | 5/1996 | Sullivan | 235/145 R |
| 5,536,170 A | * | 7/1996 | Murphy | 434/113 |
| 5,757,292 A | * | 5/1998 | Amro et al. | 341/22 |
| 6,059,575 A | * | 5/2000 | Murphy | 434/112 |
| 6,285,299 B1 | * | 9/2001 | King-DeBaun | 341/23 |
| 6,357,940 B1 | * | 3/2002 | Murphy | 400/483 |

* cited by examiner

*Primary Examiner*—Regina Liang
(74) *Attorney, Agent, or Firm*—Bourque & Associates

(57) ABSTRACT

A keycap is used to display a plurality of indicia, such as Braille, pictures, etc., for use with a keyboard that interacts with an electronic device, such as a computer. The keycap includes at least one engagement member, for removably engaging with at least one activation key on a keyboard, and at least a first support structure for displaying the indicia. The first support structure is larger in at least one direction than the activation key and allows the keycap to display the indicia in a sufficiently large size to allow the keycap to display, for example, phrases, sentences, musical notation, mathematical expressions, etc. This feature allows the keycap to be compatible with a large number of software programs used to teach, for example, disabled individuals. The keycap preferably is used with a removable overlay containing the plurality of indicia that allows the keycap to be easily configured to the user's needs or the requirements of the software program. The keycap includes at least one attachment member to removably attach the overlay to the keycap. The attachment member preferably comprises two channels disposed on opposite ends of the first support structure and a second support structure which is adapted to slidably engage with the two channels to hold the overlay immobile between the first and second support structures.

28 Claims, 4 Drawing Sheets

US 6,937,229 B2

KEYCAP FOR DISPLAYING A PLURALITY OF INDICIA

TECHNICAL FIELD

The present invention relates to touch sensitive keyboards and more particularly, to a configurable touch sensitive keyboard button overlay that allows existing touch sensitive keyboards to work with various software programs.

BACKGROUND INFORMATION

Computers can be useful tools for communicating with and/or teaching individuals with disabilities, if the individuals have a way of interacting with the computer. Special computer keyboards using specially designed keycaps have been designed for individuals with motor difficulties from such disabilities as cerebral palsy, cognitive impairments, and brain trauma and blind individuals.

One such type of keyboard used is a touch sensitive keyboard having removable keycaps. These touch sensitive keyboards use overlays with various letters, numbers, or symbols to allow disabled individuals to learn and/or play games with the computer. For example, the computer may ask the student questions requiring the student to properly answer the question by activating a touch sensitive region on the keyboard.

However, even these specially designed touch sensitive keyboards have limitations because they are not able to interact with many of the features of existing software programs. Many software programs that are designed to teach students to read often ask students to locate sentences or multiple words or characters. For example, a software program may instruct a student to find the sentence, "The dog jumped over the fence."

Unfortunately, the keycaps currently used with the known touch sensitive keyboards are limited because they can only display a single character or symbol on a specific position or switch on a keyboard at a time. Accordingly, each character or symbol of a word must utilize a separate position or switch on the keyboard. As a result, students cannot simply press/slide a single keycap on the keyboard and have the computer tell the user what the sentence says or verify that the student has chosen/located the proper words or phrase. In addition, each keycap has fixed information that cannot be changed or modified to suit the needs of the student, trainer or software program.

Accordingly, what is needed is a device that allows existing touch sensitive keyboards to interact with existing software programs. The device should allow the keyboard to be configured in a way which would allow a student to press/slide a single button and allow the software program to recognize the entire phrase or sentence. There is also a need for a device that allows an instructor to easily and inexpensively alter the button to display a wide variety of symbols, characters, phrases, or sentences.

SUMMARY

The present invention features a keycap for use with a keyboard having a plurality of activation keys. The keycap comprises at least one engagement member, for removably engaging the keycap with at least one of the activation keys and at least a first support structure. The first support structure includes first and second surfaces disposed above a top surface of the engagement member and is larger than at least one of the activation keys. The first support structure is also adapted to display a plurality of indicia.

According to a preferred embodiment, the keycap further includes at least one attachment member, for removably attaching an overlay, containing the indicia, to the first surface of the first support structure. The attachment member may be selected from the group consisting of clips, hook and loop fasteners, releasable adhesives, and snaps, but preferably comprises at least a second support surface and a pair of channels disposed on opposite ends of the second surface of the first support structure.

The second support structure is adapted to be interfaced with the top surface of the engagement member and slidably engage the pair of channels. In use, the overlay is sandwiched or otherwise held immobile between the first support structure and the second support structure with the indicia being disposed on the first surface of the first support structure.

In another embodiment, the first surface of the first support structure is preferably substantially flat and at least the first support structure or the second support structure further includes orientation indicia. The second support structure preferably has a generally trapezoidal shape and the pair of channels preferably have a corresponding generally inverted trapezoidal shape adapted to slidably engage with and provided a stop for the generally trapezoidal second support structure. Other structures may also be used other than a trapezoidal shape which serve as a "stop" to prevent the first support structure from sliding off or disengaging from the second support structure at least in one direction when pushed against by a user.

Optionally, the keycap may include at least two engagement members that removably engage at least two activation keys.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
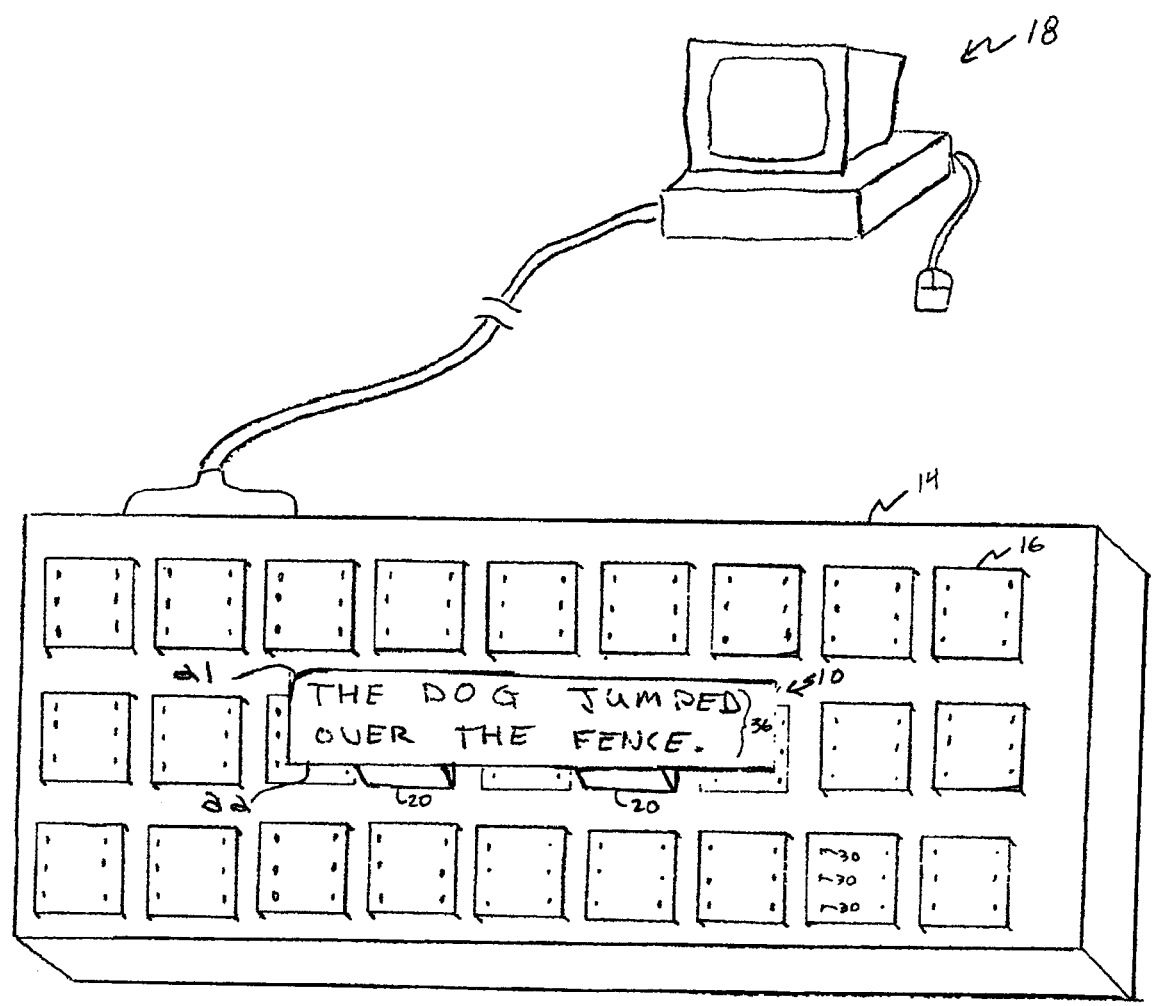
FIG. 1 is schematic diagram of the keycap used with a touch sensitive keyboard and a computer, according to one embodiment of the present invention.

A keycap 10, FIG. 1, according to the present invention, displays a plurality of indicia 36 and is used in conjunction with an input device 14 to interface with an electronic or mechanical device 18 such as, but not limited to, a computer. The input device 14 is typically a touch sensitive keyboard having a plurality of activation keys 16, one or more of which is adapted to receive the keycap 10, such as those described in U.S. Pat. No. 6,059,575, incorporated fully herein by reference.

The keycap 10 is preferably made from plastic, and in particular ABS plastic, but may also be made from any other material such as, but not limited to, composites, metal, and rubber. The keycap 10 includes at least one engagement member 20 and a first support structure 22.the support structure may also include a region 21, such as a rounded corner, which facilitates proper orientation of the keycap 10.

Figure 2:
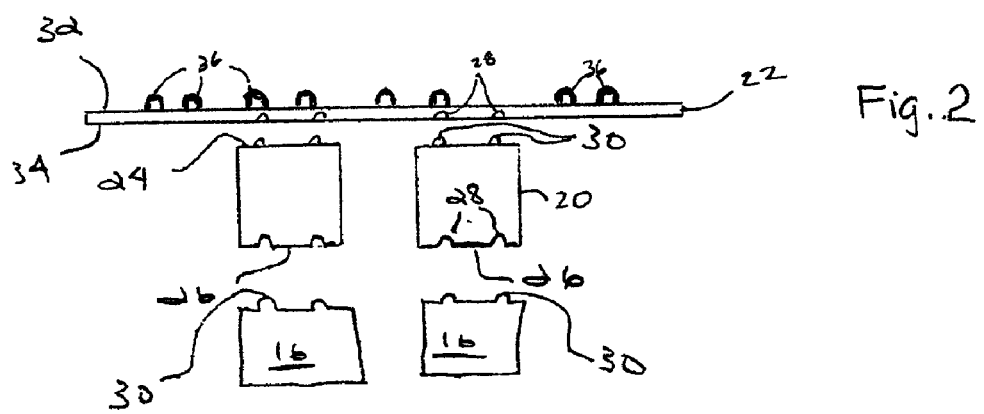
FIG. 2 is cross-sectional perspective view of a keycap not connected to engagement members, according to one embodiment of the present invention.

The engagement member 20, FIG. 2, has a top surface 24 and a bottom surface 26 designed to removably engage with at least one of the activation keys 16. The specific design of the bottom surface 26 of the engagement member 20 is dependant upon the design of the activation keys 16 and is within the ordinary skill of one skilled in the art.

In a preferred embodiment, the bottom surface 26 of each engagement member 20 includes one or more cavities 28 sized to frictionally engage a plurality of corresponding protrusions 30 located on the top of the activation keys 16. In another embodiment, the engagement member 20 may utilize snaps or hook and loop fasteners (not shown) to removably engage the keycap to one or more activation keys 16.

The first support structure 22 is coupled proximate the top surface 24 of the engagement member 20 and includes a first top surface 32 and a second bottom surface 34. The first support structure 22 is larger in at least one direction than the activation key 16, which allows the top surface 32 to display a plurality of indicia 36 of sufficient size to be read by an individual with a disability. The plurality of indicia 36 can also be arranged in, but not limited to, sentences, phrases, musical lines, and mathematical formulas cooperating with, for example, a software program. The plurality of indicia 36 may include, but are not limited to, Braille, symbolic representations, alphanumeric characters, pictures, music, math, or a combination thereof.

In a preferred embodiment, the first surface 32 of the first support structure 22 is substantially flat and free from any encumbrances. Because many disabled individuals often use touch to read, encumbrances located on the top surface 32 of the first support structure 22 can cause confusion and lead to difficulty in distinguishing the encumbrances from the indicia 36, for example Braille characters. The top surface 32 of the first support layer 22 may optionally include a plurality of integrally attached or molded indicia 36.

According to another embodiment, the first support structure 22 and the engagement member 20 are permanently attached or molded together. In yet another embodiment, the support structure 22, is removably attached to the top surface 24 of the engagement member 20 using any of the removable engagement methods described above.

Figure 3:
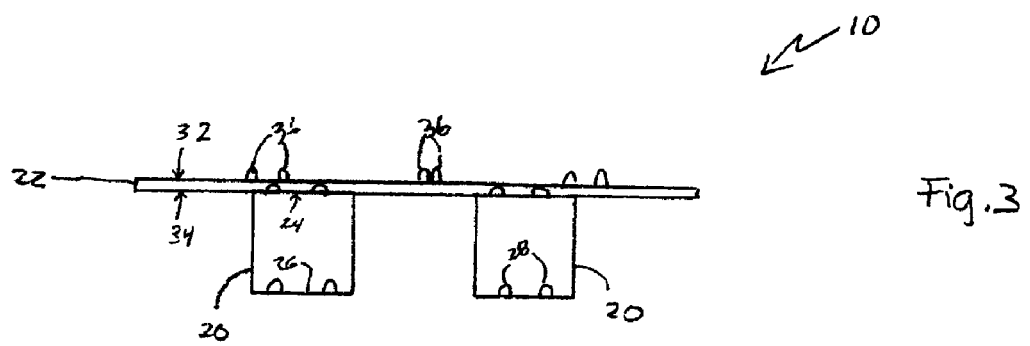
FIG. 3 is another cross-sectional perspective view of a keycap connected to two engagement members, according to one embodiment of the present invention.

Preferably, the second surface 34 of the first support structure 22 includes a plurality of cavities 28 which frictionally engage a plurality of corresponding protrusions 30 on the top surface 24 of the engagement member 20, FIG. 3.

Figure 4:
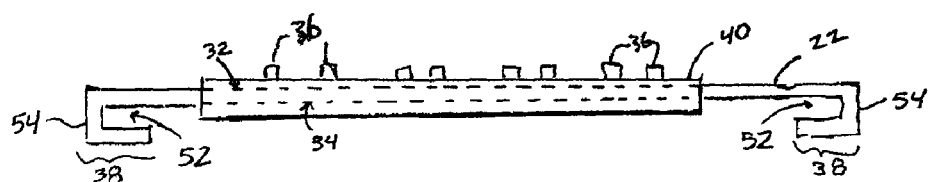
FIG. 4 is a cross-sectional perspective view of the first support structure and an overlay, according to one embodiment of the present invention.

In a preferred embodiment, the first support structure 22, FIG. 4, further includes at least first and second attachment members 38 that form cavities 52, for facilitating removably attaching a removable overlap 40 to the first surface 32 of the first support structure 22.

Figure 5:
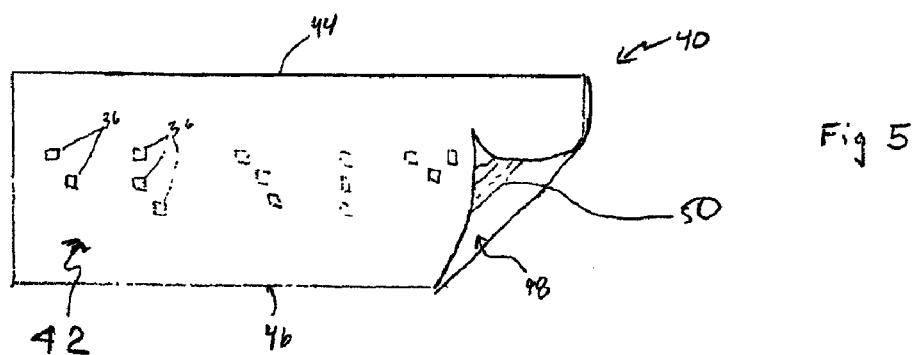
FIG. 5 is to plan view of an overlay, according to another embodiment of the present invention.

The overlay 40, FIG. 5, includes a plurality of indicia 36 on at least a front surface 42 and has a first edge 44 and a second edge 46. In a preferred embodiment, the overlay 40 is formed from at least a portion of a 3" by 5" index card in which Braille may be easily applied by a user using several well known Braille writers. The use of attachment members 38 allows the keycap 10 to be compatible with a multitude of software programs because the keycap 10 may be easily customized to display the necessary indicia 36, such as raised Braille projections or other tactile (touch sensitive) indicia to be used in conjunction with any software program.

In another embodiment, the overlay 40 may include pre-made words, symbols, phrases, sentences, etc. corresponding to a specific software program. The back surface 48 of the overlay 40 may optionally include an adhesive portion 50 (either permanent or removable) for adhering the overlay 40 onto the first surface 32 of the first support structure 22.

Figure 6:
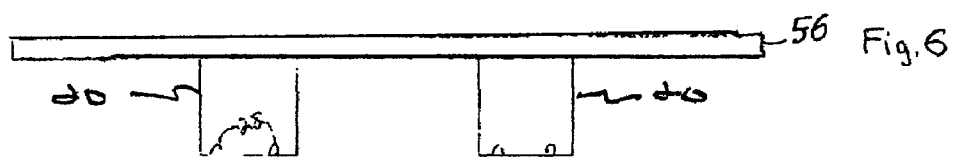
FIG. 6 is a cross-sectional perspective view of the second support structure, according to one embodiment of the present invention.

According to a preferred embodiment, the attachment member 38, FIG. 4, includes a pair of channels 52 on opposite ends 54 of the first support structure 22. The second support structure 56, FIG. 6, having at least one engagement member 20, is adapted to slidably engage with and into the pair of channels 52, as shown in FIG. 7.

Figure 7:
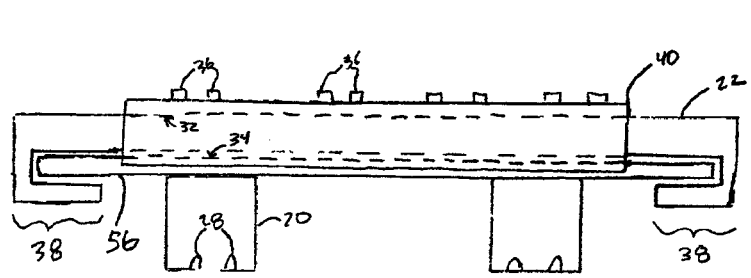
FIG. 7 is a cross-sectional perspective view the keycap including an attachment member and an overlay, according to one embodiment of the present invention.

In use, the overlay 40, FIG. 7, is preferably wrapped around and under the first support structure 22 so that the plurality of indicia 36 are located on the first or top surface 32 of the first support structure 22 and the two overlay edges 44, 46 are folded under and located proximate the second or bottom surface 34 of the first support structure 22. The second support surface 56 is then slid in between the pair of channels 52 effectively sandwiching the overlay 40 between the first support structure 22 and second 56 support structure. This embodiment allows a user to quickly and easily change the overlay 40 and indicia 36 giving the keycap 10 greater flexibility and compatibility with software programs.

In a further preferred embodiment, the keycap 10 includes some mechanism or interaction between the first and second support structures that serve to prevent the first support structure from disengaging from the second support structure at least in one horizontal direction, such as when the keycap 10 is pushed, with some forward movement, by the user.

Figure 8:
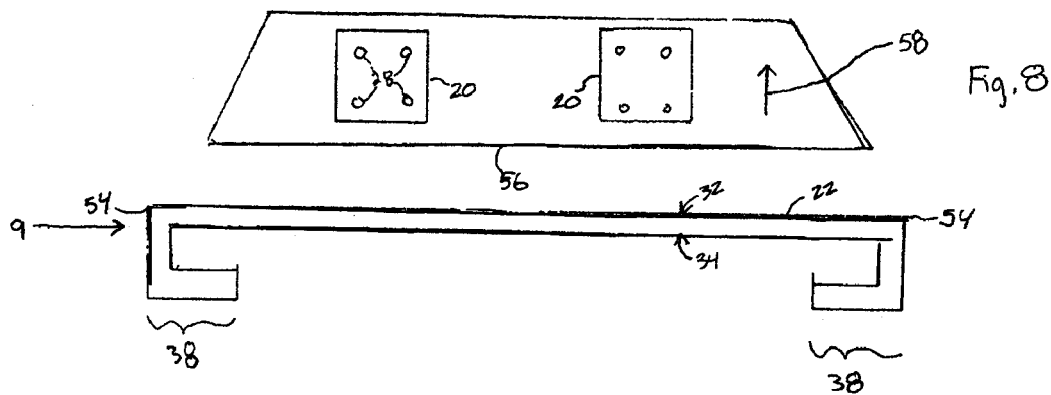
FIG. 8 is an exploded view of the first support structure and the second support structure, according to another embodiment of the present invention.
Figure 9:
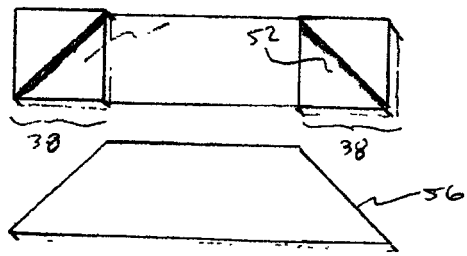
FIG. 9 is plan view of the first support structure and the second support structure, according to FIG. 8.

One example of such an arrangement includes, but is not limited to, the second support structure 56, FIG. 8, having a generally trapezoidal shape. The pair of channels 52 located on the first support structure 22 have a corresponding generally inverted trapezoidal shape, FIG. 9, which is adapted to slidably engage with and interface with the generally trapezoidal second support structure 56 at a predetermined position, thereby preventing the first support structure from being pushed off the second support structure.

It is preferred that the first support structure 22 include a "stop" in relation to the second support structure 56 to help insure that when a user pushes against the keycap 10 of the present invention, the first support structure will not "disengage" from the second support structure and the support member(s) when pushed at least in a horizontal direction.

Optionally, the second support structure 56 may include an orientation or direction of engagement indicia 58. The orientation indicia 58 allows an individual to easily determine the proper orientation of the second support structure 56 relative to the first support structure 22.

According to another embodiment, the attachment member 38 may be selected from the group consisting of clips, hook and loop (Velcro® brand hook and loop fasteners, for example), releasable adhesives, and snaps.

Although the present invention has been illustrated and explained utilizing a support structure 22 coupled to two (2)

engagement members 20, this is not a limitation of the present invention as it is contemplated that a support structure having only one engagement member may be utilized, depending on the needs of the user, trainer or software program in conjunction with the amount of indicia to be displayed or presented to the user.

Modifications and substitutions by one of ordinary skill in the art are considered to be within the scope of the present invention, which is not to be limited except by the following claims.

The invention claimed is:

1. A keycap for use with a keyboard having a plurality of activation keys, said keycap comprising:
   at least one engagement member, for removably engaging said keycap to at least one of said plurality of activation keys; and
   at least a first support structure having a first and a second surface and being disposed above a top surface of said engagement member, said first support structure being larger than said at least one of said plurality of activation keys and adapted to display a plurality of indicia wherein said first support structure is removably attached to said engagement member.

2. The keycap as claimed in claim 1 wherein said plurality of indicia are selected from the group consisting of symbols, characters, pictures, and Braille indicia.

3. The keycap as claimed in claim 1 further comprising at least one attachment member, for removably attaching an overlay containing said plurality of indicia to said first surface of said first support structure.

4. The keycap as claimed in claim 3 wherein said attachment member is selected from the group consisting of clips, hook and loop fasteners, releasable, adhesives, and snaps.

5. The keycap as claimed in claim 3 wherein said attachment member comprises:
   a pair of channels disposed on opposite ends of said second surface of said first support structure; and
   at least a second support structure adapted to slidably engage said pair of channels, wherein said overlay is held generally immobile between a bottom surface of said first support structure and a top surface of said second support structure, and wherein said plurality of indicia of said overlay are adapted to be disposed proximate said first surface of said first support structure.

6. The keycap as claimed in claim 5 wherein said first surface of said first support structure is substantially flat.

7. The keycap as claimed in claim 5 wherein at least one of said first support structure and said second support structure further includes orientation indicia.

8. The keycap as claimed in claim 5 wherein at least one of said pair of channels, said second support structure and said first support structure include a stop mechanism preventing said first Support structure from disengaging with said second support structure in at least one horizontal direction.

9. The keycap as claimed in claim 8 wherein said stop mechanism includes said second support structure generally trapezoidal in shape and said pair of channels generally inverted and corresponding trapezoidal shape adapted, for slidably engaging with said generally trapezoidal second support structure.

10. The keycap as claimed in claim 1 wherein said keycap includes at least two of said engagement members that removably engage at least two of said activation keys.

11. A keycap for use with an overlay having a plurality of indicia and a keyboard having a plurality of activation keys, said keycap comprising:
   at least one engagement member, for removably engaging said keycap to at least one of said plurality of activation keys;
   at least a first support structure having a first and a second surface, and being disposed above a top surface of said engagement member, said first support structure being larger than at least one of said activation keys; and
   at least one attachment member, for removably attaching said overlay proximate to a first surface of said first support structure.

12. The keycap as claimed in claim 11 wherein said attachment member is selected from the group consisting of clips, hook and loop fasteners, releasable adhesives, and snaps.

13. The keycap as claimed in claim 11 wherein said attachment member comprises:
   a pair of channels disposed on opposite ends of said second surface of said first support structure; and
   at least a second support structure adapted to slidably engage said pair of channels, wherein said overlay is held generally immobile between a bottom surface of said first support structure and a top surface of said second support structure, and wherein said plurality of indicia of said overlay are adapted to be disposed proximate said first surface of said first support structure.

14. The keycap as claimed in claim 13 wherein said first surface of said first support structure is substantially flat.

15. The keycap as claimed in claim 13 wherein at least one of said first support structure and said second support structure further includes orientation indicia.

16. The keycap as claimed in claim 13 wherein at least of said pair of channels, said second support structure and said first support structure include a stop mechanism preventing said first support structure from disengaging with said second support structure in at least one horizontal direction.

17. The keycap as claimed in claim 16 wherein said stop mechanism includes said second support structure generally trapezoidal in shape and said pair of channels generally inverted and corresponding trapezoidal shape adapted, for slidably engaging with said generally trapezoidal second support structure.

18. The keycap as claimed in claim 11 wherein said keycap includes at least two of said engagement members that removably engage at least two of said activation keys.

19. A keycap for use with an overlay having a plurality of indicia and a keyboard having a plurality of activation keys, said keycap comprising:
   at least one engagement member, for removably engaging said keycap to at least one of said plurality of activation keys;
   at least a first support structure having a first and second surface;
   a pair of channels disposed on opposite ends of said second surface of said first support structure; and
   at least a second support structure adapted to slidably engage said pair of channels, wherein said overlay is held generally immobile between a bottom surface of said first support structure and a top surface of said second support structure, and wherein said plurality of indicia of said overlay are adapted to be disposed proximate said first surface of said first support structure.

20. The keycap as claimed in claim 19 wherein said first surface of said first support structure is substantially flat.

21. The keycap as claimed in claim 19 wherein at least one of said first support structure and said second support structure further comprises orientation indicia.

22. The keycap as claimed in claim 19 wherein at least one of said pair of channels, said second support structure and said first support structure include a stop mechanism preventing said first support structure from disengaging with said second support structure in at least one horizontal direction.

23. The keycap as claimed in claim 22 wherein said stop mechanism includes said second support structure generally trapezoidal in shape and said pair of channels generally inverted and corresponding trapezoidal shape adapted, for slidably engaging with said generally trapezoidal second support structure.

24. The keycap as claimed in claim 19 wherein said keycap includes at least two of said engagement members that removably engage at least two of said activation keys.

25. A keycap for use with an overlay having a plurality of indicia and a keyboard having a plurality of activation keys, said keycap comprising:

- at least one engagement member, for removably engaging said keycap to at least one of said plurality of activation keys;
- at least a substantially flat first support structure having a first and a second surface;
- a pair of channels disposed on opposite ends of said second surface of said first support structure; and
- at least a second support structure adapted to slidably engage said pair of channels, wherein said overlay is held generally immobile between a bottom surface of said first support structure and a top surface of said second support structure, and wherein said plurality of indicia of said overlay are adapted to be disposed proximate said first surface of said first support structure, wherein at least one of said pair of channels, said second support structure and said first support structure include a stop mechanism preventing said first support structure from disengaging with said second support structure in at least one horizontal direction.

26. The keycap as claimed in claim 25 wherein said stop mechanism includes said second support structure generally trapezoidal in shape and said pair of channels generally inverted and corresponding trapezoidal shape adapted, for slidably engaging with said generally trapezoidal second support structure.

27. The keycap as claimed in claim 25 wherein at least one of said first support structure and said second support structure further comprises orientation indicia.

28. The keycap as claimed in claim 25 wherein said keycap includes at least two of said engagement members that removably engage at least two of said activation keys.

\* \* \* \* \*